Figure 1:
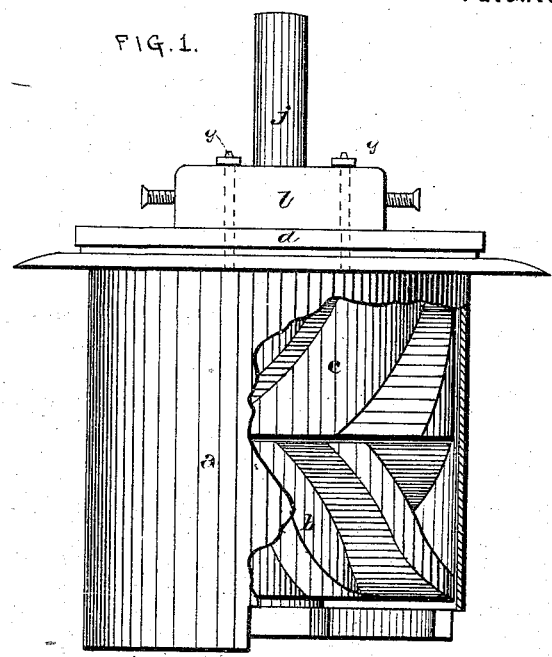
Figure 2:
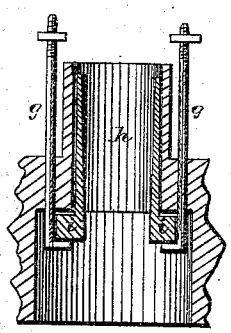
Figure 3:
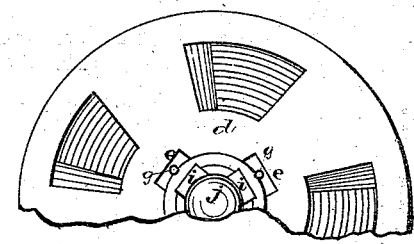
Figure 4:
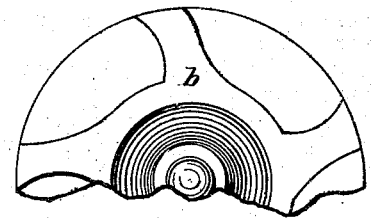

T. FLINN.
Water-Wheels.

No. 152,738. Patented July 7, 1874.

WITNESSES.

INVENTOR.
Thos. Flinn
per
F. A. Lehmann, Atty.

UNITED STATES PATENT OFFICE.

THOMAS FLINN, OF NEWCASTLE, PENNSYLVANIA.

IMPROVEMENT IN WATER-WHEELS.

Specification forming part of Letters Patent No. 152,738, dated July 7, 1874; application filed June 1, 1874.

*To all whom it may concern:*

Be it known that I, THOMAS FLINN, of Newcastle, in the county of Lawrence and State of Pennsylvania, have invented certain new and useful Improvements in Water-Wheels; and I do hereby declare the following to be a full, clear, and exact description of the invention, such as will enable others skilled in the art to which it pertains to make and use it, reference being had to the accompanying drawings which form part of this specification.

The nature of my invention relates to an improvement in turbine water-wheels; and it consists in the arrangement and combination of parts, which will be more fully described hereafter, whereby a cheap and powerful wheel is produced.

The accompanying drawings represent my invention.

$a$ represents a circular casing, in which the wheel $b$ revolves. The buckets of this wheel are curved downward around their hub, and have their upper and lower surfaces made concave, as shown, so as to better hold and retain the water, and prevent it from flying outward by centrifugal force against the sides of the casing, where its force is more or less impaired. Secured in the top of the casing, just above the wheel, are the chutes $c$, curved and shaped like the buckets, but turned in an opposite direction, so that the water will strike with its full force against them. Upon the top of the casing is placed the perforated disk $d$, which serves as a gate for letting on and shutting off the water, and which has a number of notches, $e$, cut around its center, up through which the rods $g$ pass, so as to prevent it from moving too far in either direction. Upon the top of the chutes $c$ is formed a stuffing-box, $h$, in which are placed a number of followers, $i$, which form a packing around the shaft $j$. Each one of these followers has a head formed upon its lower end, under which the bent ends of the screw-rods $g$ catch, so that as the followers wear away they can be drawn up around the shaft again by means of the nuts on top of the cap $l$.

Having thus described my invention, I claim—

1. A water-wheel having its buckets made concave on its upper and lower surfaces, so as to retain the water in the wheel, substantially as described.

2. The combination of the followers extending up through the end of the stuffing-box, with the headed screw-rods for adjusting them, substantially as specified.

In testimony that I claim the foregoing I have hereunto set my hand this 25th day of May, 1874.

THOMAS FLINN.

Witnesses:
EDWARD O. BRIEN,
DANIEL GILES.